United States Patent [19]

Bertin

[11] 4,406,341
[45] Sep. 27, 1983

[54] POWER-ASSISTED STEERING DEVICE

[75] Inventor: Patrice Bertin, Paris, France

[73] Assignee: Valeo, Paris, France

[21] Appl. No.: 353,899

[22] Filed: Mar. 2, 1982

[30] Foreign Application Priority Data

Mar. 18, 1981 [FR] France .............................. 81 05397

[51] Int. Cl.³ .............................................. B62D 5/08
[52] U.S. Cl. ................................. 180/148; 91/375 A;
137/625.21
[58] Field of Search ....................... 180/148, 146, 147;
91/375 A; 292/256.6; 137/625.21, 625.24

[56] References Cited

U.S. PATENT DOCUMENTS 3,645,296 2/1972 Adams ............................ 137/625.69
4,194,531 3/1980 Bishop ............................ 137/625.24

FOREIGN PATENT DOCUMENTS 2233304 9/1973 Fed. Rep. of Germany ...... 180/148

2380932 9/1978 France .

Primary Examiner—John A. Pekar
Assistant Examiner—D. Lynn Fugate
Attorney, Agent, or Firm—Young & Thompson

[57] ABSTRACT

A power-assisted steering device for a vehicle which has a steering column consisting of two coaxial shafts, an input and an output shaft, which are coupled so that they have a limited relative angular play between them and which are rotationally fast with rotors of a hydraulic distributor. In case of accidental breakage of the torsion bar which couples the two shafts elastically, an axially acting stop means is provided between the input shaft and the housing of the distributor so as to prevent the input shaft from separating from the output shaft. This stop means consists of a washer which has a prolongation projecting towards the input shaft. The washer additionally maintains the sealing gasket which is between the input shaft and the distributor housing in position on the housing.

12 Claims, 11 Drawing Figures

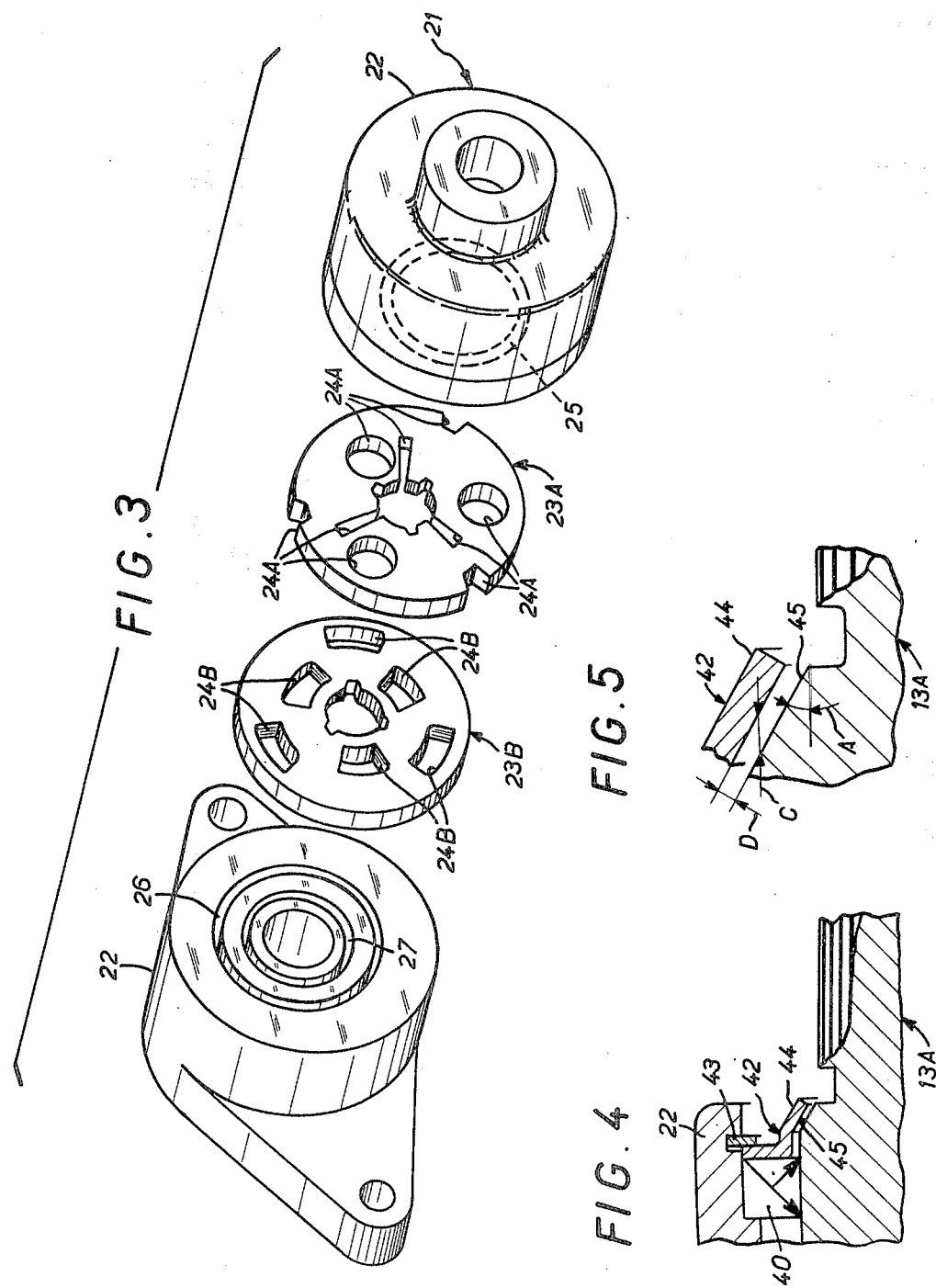

POWER-ASSISTED STEERING DEVICE

BACKGROUND OF THE INVENTION

The present invention relates to a power-assisted steering device for a vehicle, comprising control means acting on steering means, the control means comprising a rotatable transmission element having an input shaft and an output shaft which are coaxial and are located one after the other and are coupled elastically by a torsion bar, a limited relative angular play being provided between said shafts to permit an angular offset under the action of the control means and against an elastic restoring action of the torsion bar, power-assistance means which, in response to such an angular offset, are allowed to act on the turning means in the same direction as the control means, said power-assistance means comprising a hydraulic unit, an actuator acting on the turning means and a distributor located between the unit and the actuator and having a fixed housing and at least one rotor rotating integrally with one of said shafts, a sealing gasket between each of said shafts and the housing of the distributor, and a stop means in axial direction between the input shaft and the housing so as to prevent the input shaft from separating from the output shaft, if the torsion bar breaks.

This stop means has an important function for safety. In fact, the torsion bar, which elastically couples the input shaft and the output shaft, positions these two shafts axially relative to one another. If, for any reason, the torsion bar breaks, it no longer retains the input shaft axially relative to the output shaft.

In general terms, the rotating transmission element consisting of a steering column has a telescopic assembly. If, therefore, the input shaft were to separate from the output shaft, not only would the power assistance no longer operate, but, and this is serious, the driver could no longer even take advantage of a take-over of the turning torque by means of a manual stand-by facility.

Consequently, the stop means in an axial direction is provided to prevent such a separation of the input shaft.

In general, this stop means consists of a circlip or any other projection formed, for example, by the end of a pin, mounted on the input shaft actually within the distributor and interacting as a stop, if the torsion bar breaks, with the housing or a member integral with the housing axially. However useful this arrangement may be for safety, it nevertheless has the disadvantage of complicating the construction.

The subject of the present invention is a power-assisted steering device for a vehicle, of the type mentioned above, the construction of which is especially simple.

SUMMARY OF THE INVENTION

According to the invention, this device is characterised in that the stop means consists of a washer which maintains the sealing gasket, provided between the input shaft and the housing, in position on the housing, said washer having, towards the input shaft, a prolongation which is axially adjacent to a stop bearing of the input shaft.

By means of this arrangement, the washer has a double function, on the one hand a function which involves maintaining the sealing gasket in position on the housing, and on the other hand an additional function which involves preventing the input shaft from separating from the output shaft if the torsion bar breaks. Construction is simplified in this way.

In one embodiment, the prolongation of the washer and the stop bearing of the input shaft are oblique, forming a predetermined angle, for example 30°, with the axis of the input shaft. This arrangement makes it possible to give the shortest distance separating the prolongation of the washer and the stop bearing of the input shaft a value which is smaller than the axial travel allowed to the input shaft and defined by the stop means. Thus, the washer is very close to the input shaft and has an additional role as a dust cover, preventing dust from reaching the gasket.

The latter is protected in this way and can fulfill its sealing function in a durable way under excellent conditions.

In an alternative form, the prolongation of the washer and the stop bearing of the input shaft are perpendicular to the axis of the input shaft.

In one embodiment, the stop bearing of the input shaft is formed by a shoulder, in particular an oblique shoulder, of the input shaft, whilst, in an alternative form, the stop bearing of the input shaft is formed by a groove in this input shaft.

In the latter case, the washer is shaped in such a way that, for it to be assembled, the prolongation of this washer can be introduced into the groove. For this purpose, the washer has a central orifice which has a widened portion or which is prolonged up to the periphery of the washer. The washer can also be divided into two halves.

In another alternative form, the stop bearing of the input shaft is formed by a circlip engaged on the input shaft.

It should be noted that the washer maintains the sealing gasket in position on the housing by all suitable means, particularly by being maintained itself on the housing by a circlip.

BRIEF DESCRIPTION OF THE DRAWINGS

FIG. 3 shows this distributor diagrammatically in an exploded perspective;

FIG. 4 is an enlarged view of a detail of FIG. 2 and shows the washer which has the double function of maintaining the sealing gasket of the input shaft in position on the housing and of forming a stop means for the input shaft if the torsion bar breaks;

FIG. 5 is a partial view, on an even larger scale, of this washer and the input shaft;

DESCRIPTION OF THE PREFERRED EMBODIMENTS

Figure 1:
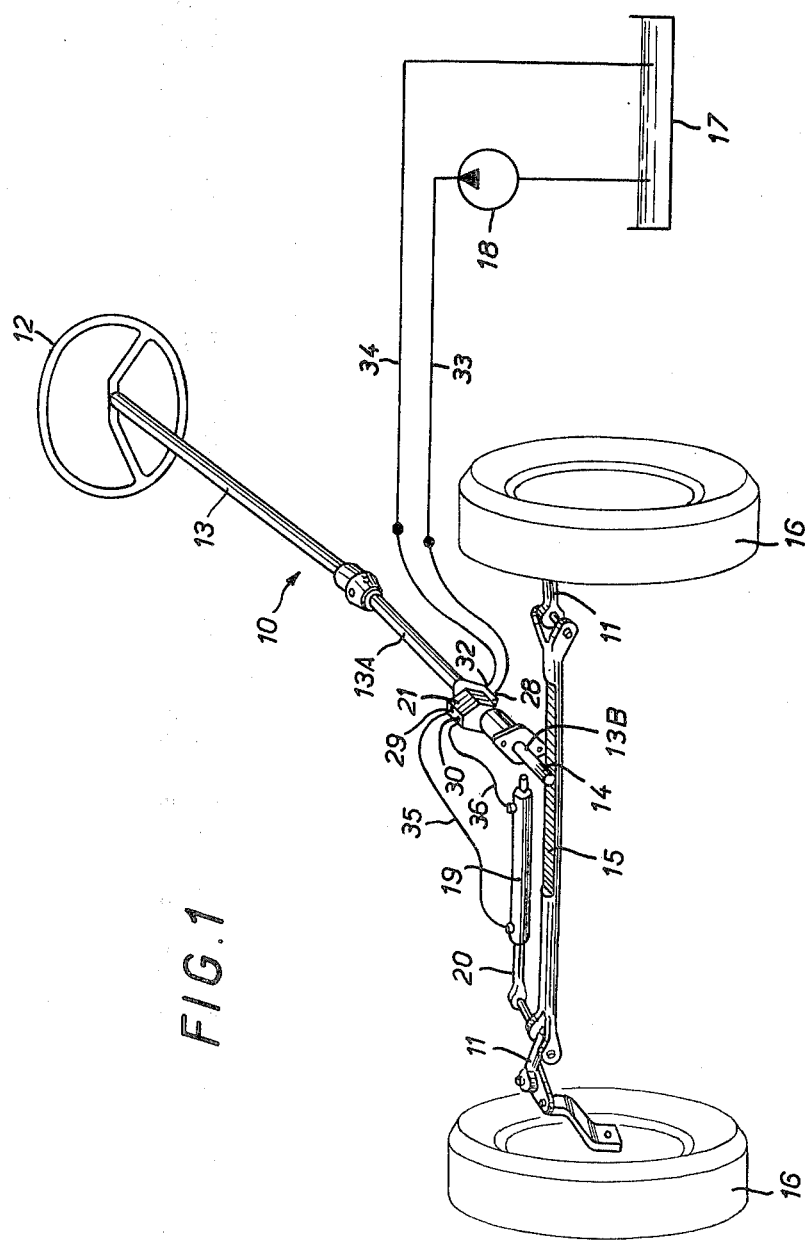
FIG. 1 is a diagrammatic view in perspective of a power-assisted steering device according to the invention.

Reference will first be made to FIGS. 1 to 5 which relate, by way of a non-limiting example, to an application of the invention to a power-assisted steering device for a vehicle.

This device comprises (FIG. 1) control means 10 operable to act on steering means such as track rods 11. The control means 10 comprise a steering wheel 12 and a steering column 13. The latter constitutes a rotatable transmission element and comprises an input shaft 13A and an output shaft 13B which are coaxial and are located one after the other. The shafts 13A and 13B are coupled to one another to be capable of a limited relative angular displacement under the action of the control means 10. The shaft 13A is integral with the steering wheel 12, whilst the shaft 13B is integral with a pinion 14 which meshes with a rack 15. The latter controls the orientation of the front wheels 16 of the vehicle by means of the track rods 11.

A power-assistance hydraulic unit comprises a tank 17 and a pump 18 drawing from this tank 17.

An actuator is formed by a hydraulic jack 19, the piston rod 20 of which acts on the rack 15. A hydraulic distributor 21 is located between the pump 18 and the jack 19 and is sensitive to the angular offset of the two shafts 13A and 13B so as to make the jack 19 act on the track rods 11 in the same direction as the control means 10.

Figure 2:
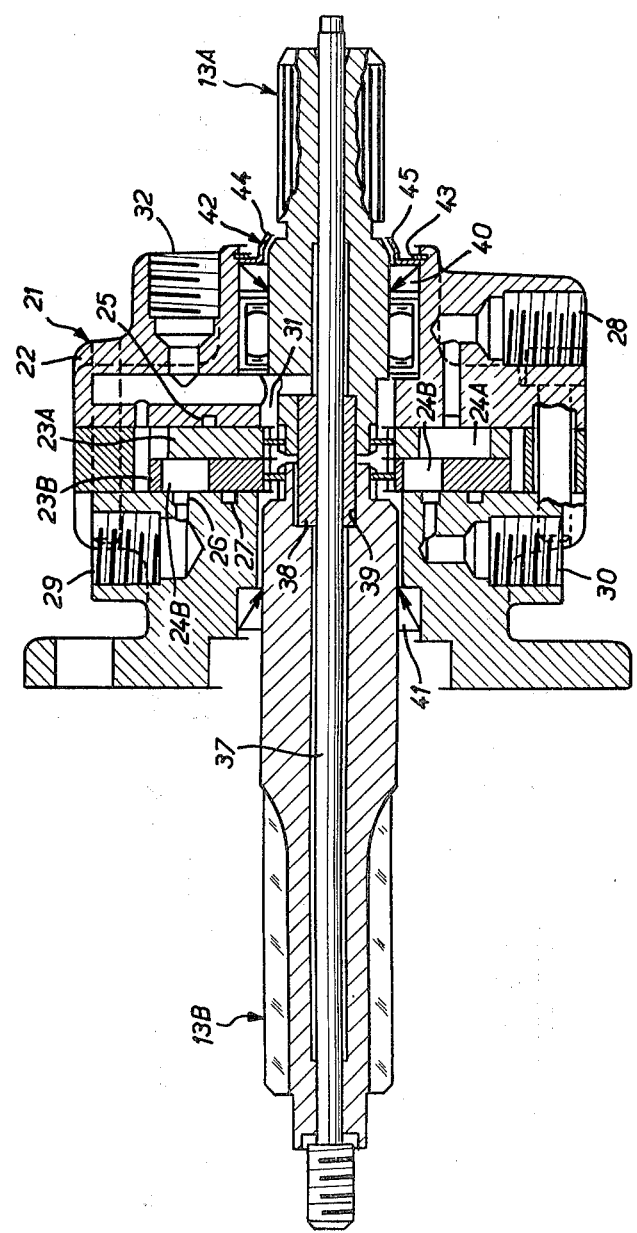
FIG. 2 is a view of the distributor of this device on a larger scale and in longitudinal section.

In the example shown in FIG. 2, the distributor 21 comprises a housing 22 and two adjacent rotor discs 23A, 23B which are rotationally fast with the two shafts 13A and 13B respectively. The rotor discs 23A and 23B are provided respectively with various hydraulic passages 24A and 24B (FIGS. 2 and 3).

The passages 24A and 24B of the rotor discs 23A and 23B are communicable with grooves 25, 26 and 27 which are made in the housing 22 and which are connected to orifices 28, 29 and 30 respectively. The passages 24A and 24B of the rotors 23A and 23B are also communicable with a return passage 31 which is made in the centre of the distributor 21 and which is connected to an orifice 32 in the housing 22.

The orifice 28 is a pressure orifice connected by a pipe 33 (FIG. 1) to the pump 18. The orifice 32 is a return orifice connected by a pipe 34 to the tank 17. The orifices 29 and 30 are service orifices connected respectively by pipes 35 and 36 to the two sides of the jack 19.

The shafts 13A and 13B (FIG. 2) are coupled elastically by a torsion bar 37. Furthermore, an element 38 having a prism-shaped cross-section is integral with one of the shaft 13A and 13B, for example the shaft 13A, and is engaged with angular play, in a cavity 39 of prism-shaped cross-section in the other shaft 13B. The angular play between the element 38 and the cavity 39 defines the limited relative angular play between the shafts 13A and 13B. This play is a few degrees on either side of a mean neutral position of rest which tends to be restored and maintained by the torsion bar 37.

Depending on the relative angular position of the two rotor discs 23A and 23B, one or other of the following operating positions prevails:

The pressure orifice 28 is put in communication, via the passages 24A and 24B of the rotor discs 23A and 23B, with the return orifice 32 to the tank 17, which corresponds to the neutral position of rest, and in this case the power assistance is not involved;

The pressure orifice 28 is put in communication, via the passages 24A and 24B of the rotor discs 23A and 23B, with the service orifice 29, thus causing the jack 19 to intervene in one direction.

The pressure orifice 28 is put in communication, via the passages 24A and 24B of the rotor discs 23A and 23B, with the other service orifice 30, thus causing the jack 19 to intervene in the other direction.

In the absence of any action by the driver on the steering wheel 12, the shafts 13A and 13B are maintained in the neutral angular position of the rest by the torsion bar 37. The system functions with an open centre and the jack 19 is not stressed.

When the driver exerts action on the steering wheel 12 to turn the wheels 16, the shafts 13A and 13B are offset relative to one another in a specific direction, and the relative angular position of the two discs 23A and 23B passes from the neutral position of rest to a working position in which the delivery of the pump 18 passes from the orifice 28 to the corresponding service orifice 29 or 30. The jack 19 thus acts in the desired steering direction.

In case of failure of the power-assistance means 17, 18, the effect of the turning action on the steering wheel 12 is to absorb the limited relative angular play between the shafts 13A and 13B which is defined by the piece 38 in the cavity 39. The elastic resistance given by the torsion bar 37 is easily overcome and, as a result of the rigid connection, made by the element 38, between the shafts 13A and 13B, the shaft 13B is driven to rotate with the shaft 13A, thus permitting manual take-over by the control means, which then effect direct turning of the wheels 16.

As will be understood, the interior of the distributor 21 must be made leak-proof to the hydraulic fluid in relation to the outside environment. For this purpose, a sealing gasket 40 is provided between the input shaft 13A and the housing 22 of the distributor 21, whilst another sealing gasket 41 is provided between the output shaft 13B and the housing 22 of the distributor 21 (FIG. 2).

Moreover, a stop means 42, which has effect in an axial direction, is provided between the input shaft 13A and the housing 22 of the distributor 21, so as to prevent the input shaft 13A from separating from the output shaft 13B if the torsion bar 37 breaks. In fact, the result of such a separation would be to make the element 38 come out of the cavity 39, preventing it from defining the limited relative angular play between the two shafts 13A and 13B. From that moment, both the power assistance and the manual take-over facility would be rendered inoperative.

The axially acting stop means 42 between the input shaft 13A and the housing 22 makes it possible to prevent such a separation of the shafts 13A and 13B.

The stop means (FIGS. 2, 4 and 5) comprises a washer 42 which maintains the sealing gasket 40 in position on the housing 22, by being maintained itself in the housing 22 by a circlip 43. The washer 42 has a prolongation 44 extending towards the input shaft 13A (FIGS. 2, 4 and 5). This prolongation 44 is axially adjacent to a stop bearing 45 of the input shaft 13A.

In the example shown in FIGS. 4 and 5, the prolongation 44 of the washer 42 and the stop bearing 45 of the shaft 13A are oblique, forming a predetermined angle A with the axis of the input shaft 13A. This angle A is advantageously of the order of 30° (FIG. 5). It will be noted that the stop bearing 45 of the input shaft 13A is formed by an oblique shoulder of this input shaft.

Because of this obliqueness at the angle A, the shortest distance, designated by D (FIG. 5), which separates the prolongation 44 of the washer 42 and the stop shoulder 45 is considerably less than the axial travel C which is allowed to the input shaft 13A before it comes to rest against the prolongation 44 of the washer 42 in the event that the torsion bar 37 breaks. Thus, this short distance D gives the prolongation 44 of the washer 42 the additional role of a dust cover which protects the gasket 40 from the penetration of dust which might impair its effective operation.

When the torsion bar 37 is undamaged, it positions the input shaft 13A axially relative to the output shaft 13B, and it operates as described above.

In the event that the torsion bar 37 breaks, the input shaft 13A is prevented from separating from the shaft 13B because its shoulder 45 comes to rest against the prolongation 44 of the washer 42. Thus, in the event that the torsion bar 37 breaks, even if the elastic action for returning to the neutral position is consequently eliminated, the user can continue to carry out turning.

Figure 6:
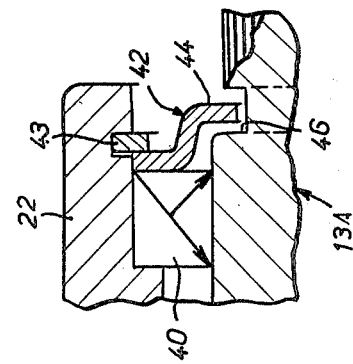
FIG. 6 is a view similar to FIG. 4, but relates to an alternative form.
Figure 7:
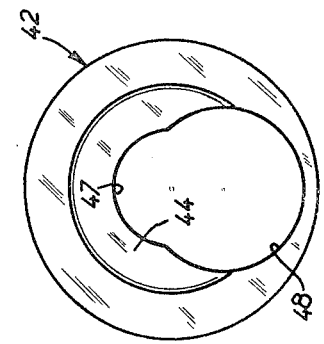
FIG. 7 is an elevation view of the washer of FIG. 6 and shows how this washer is shaped for its assembly requirements.

In an alternative form (FIGS. 6 and 7), the arrangement is similar to that described with reference to FIGS. 1 to 5, but the prolongation 44 of the washer 42 no longer interacts with a shoulder of the shaft 13A, but with a groove 46 made in the input shaft 13A. It will be noted that the prolongation 44 of the washer 42 and the groove 46 are perpendicular to the axis of the input shaft 13A.

The washer 42 is shaped in such a way that, for it to be assembled, the prolongation 44 can be introduced into the groove 46. For this purpose, the washer 42 has (FIG. 7) a central orifice 47 having a widened portion 48. This widened portion 48 is such that the washer 42 can be slipped over and slid along the shaft 13A, after which the washer 42 can be put in place, with its prolongation 44 engaged in the groove 46.

Figure 8:
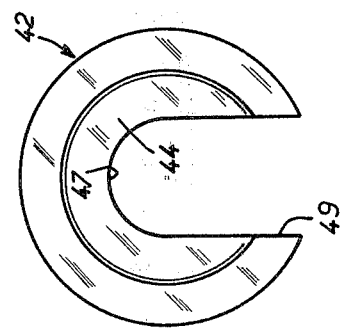

In an alternative form (FIG. 8), the central orifice 47 of the washer 42 has a portion 49 which is projected as far as the periphery of the washer 42, thus making it possible for the washer 42 to be engaged on the shaft 13A, with the prolongation 44 in the groove 46.

Figure 9:
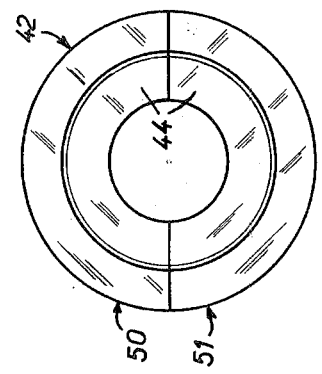
FIGS. 8 and 9 are views similar to FIG. 7, but relate respectively to two alternative shapes of the washer of FIG. 6.

In another alternative form (FIG. 9), the washer 42 is divided into two halves 50 and 51, thus making it possible for the washer 42 to be engaged on the shaft 13A, with the prolongation 44 located in the groove 46.

In another alternative form (FIG. 10), the stop bearing of the shaft 13A which interacts with the prolongation 44 of the washer 42 is formed by a circlip 52 engaged in a narrow groove 53 in the input shaft 13A.

Figure 11:
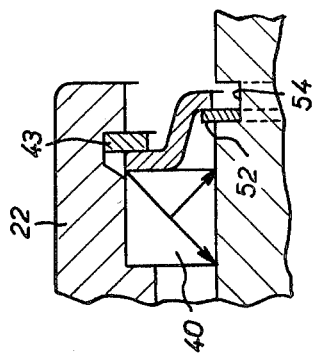
FIGS. 10 and 11 are views similar to FIG. 4 or to FIG. 6, but relate respectively to two other alternative forms.
Figure 10:
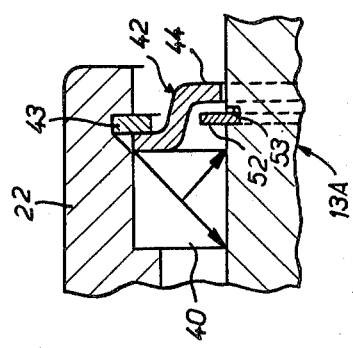

In another alternative form (FIG. 11), the arrangement is similar to that which has just been described with reference to FIG. 10, but, instead of being engaged in a narrow groove 53, as in FIG. 10, the circlip 52 is engaged in a wider groove designated by 54 in FIG. 11. This allows assembly to be made easier.

The prolongation 44 could, of course, be in the same plane as the outer ring of the washer 42.

I claim:

1. A power-assisted steering device for a vehicle, comprising control means operable to act on steering means, said control means having a rotatable transmission element comprising an input shaft and an output shaft which are coaxial and are located one adjacent the other, which are coupled elastically by a torsion bar, and which are capable of a limited relative angular displacement under the action of the control means and in opposition to an elastic restoring action of the torsion bar; power-assistance means responsive to relative angular displacement of said input shaft and said output shaft to act on said steering means in the same sense as the control means, said power-assistance means comprising a hydraulic unit, an actuator operable to act on the steering means, and a hydraulic distributor located between the hydraulic unit and the actuator, said hydraulic distributor comprising a fixed housing and at least one rotor rotationally fast with one of said input shaft and said output shaft; a sealing gasket between each of said input and output shafts and the housing of the distributor; and a stop means disposed between the input shaft and the housing, which stop means acts axially to prevent the input shaft from separating from the output shaft if the torsion bar should break, said stop means comprising a washer which maintains said sealing gasket between the input shaft and the housing in position on the housing, said washer having a prolongation which projects towards the input shaft and which is axially adjacent a stop bearing on the input shaft.

2. A power-assisted steering device according to claim 1, in which said prolongation of the washer and said stop bearing on the input shaft are oblique, forming a predetermined angle with the axis of the input shaft.

3. A power-assisted steering device according to claim 2, in which said predetermined angle is of the order of 30°.

4. A power-assisted steering device according to claim 1, in which said prolongation of the washer and said stop bearing on the input shaft are perpendicular to the axis of the input shaft.

5. A power-assisted steering device according to claim 1, 2, 3, or 4, in which said stop bearing on the input shaft comprises a shoulder of the input shaft.

6. A power-assisted steering device according to claim 1, 2, 3 or 4, in which said stop bearing on the input shaft comprises a groove formed in the input shaft.

7. A power-assisted steering device according to claim 6, in which said washer is shaped such that it can be assembled with the input shaft, introducing said prolongation into said groove.

8. A power-assisted steering device according to claim 7, in which said washer has a central orifice having a widened portion.

9. A power-assisted steering device according to claim 7, in which said washer has a central orifice having a portion extending as far as the periphery of said washer.

10. A power-assisted steering device according to claim 7, in which said washer is divided into two halves.

11. A power-assisted steering device according to claim 1, 2, 3 or 4, in which said stop bearing of the input shaft comprises a circlip engaged on the input shaft.

12. A power-assisted steering device according to claim 1, in which said washer maintains said sealing gasket between the input shaft and the housing in position on the housing by being maintained itself on the housing by a circlip.

* * * * *